United States Patent
Ye et al.

(10) Patent No.: US 9,798,395 B2
(45) Date of Patent: *Oct. 24, 2017

(54) ELECTRONIC CONTROL APPARATUS AND METHOD FOR RESPONSIVELY CONTROLLING MEDIA CONTENT DISPLAYED ON PORTABLE ELECTRONIC DEVICE

(71) Applicant: CM HK LIMITED, Fortress Hill (HK)

(72) Inventors: Zhou Ye, Taipei (TW); Shun-Nan Liou, Taipei (TW); Ying-Ko Lu, Taipei (TW); Wen-Hao Chang, Taipei (TW); Tigran Tadevosyan, Taipei (TW)

(73) Assignee: CM HK LIMITED, Fortress Hill (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,952

(22) Filed: Jan. 4, 2017

(65) Prior Publication Data
US 2017/0115750 A1    Apr. 27, 2017

Related U.S. Application Data

(63) Continuation of application No. 12/967,401, filed on Dec. 14, 2010, now Pat. No. 9,564,075.

(60) Provisional application No. 61/291,117, filed on Dec. 30, 2009.

(51) Int. Cl.
G06T 11/00    (2006.01)
G06F 3/0346    (2013.01)
G06F 3/0484    (2013.01)

(52) U.S. Cl.
CPC ........ *G06F 3/0346* (2013.01); *G06F 3/04845* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 6,201,554 | B1 | 3/2001 | Lands |
| 7,667,686 | B2 | 2/2010 | Suh |
| 7,688,306 | B2 | 3/2010 | Wehrenberg et al. |
| 7,721,968 | B2 | 5/2010 | Wigdor |
| 8,542,110 | B2 | 9/2013 | Choi |
| 8,558,870 | B2 | 10/2013 | Lee |
| 2004/0164973 | A1 | 8/2004 | Nakano et al. |
| 2006/0194181 | A1 | 8/2006 | Rosenberg |

(Continued)

*Primary Examiner* — Andrew G Yang
(74) *Attorney, Agent, or Firm* — McClure, Qualey & Rodack, LLP

(57) ABSTRACT

An electronic control apparatus including motion sensors is integrated in a portable electronic device to responsively control a media content stored in the portable electronic device, in response to motion sensor signals to flip, zoom, displace images/pages of the media content displayed on a display field of a display thereof. Accordingly, a responsive control method includes the steps of: presetting a first threshold angle; sensing an first rotation angle of the portable electronic device to send out a first rotation sensing signal as a rotation of a yaw, pitch or roll of a portable electronic device detected by a sensing module including motion sensors; and receiving the first rotation sensing signal to calculate and determine whether the first rotation angle is greater than the first threshold angle to responsively control a media content stored in an electronic control apparatus be flipped, zoomed or displaced when the first rotation angle is greater than the first threshold angle.

14 Claims, 17 Drawing Sheets

(56) References Cited

U.S. PATENT DOCUMENTS

| | | |
|---|---|---|
| 2007/0120819 A1 | 5/2007 | Young et al. |
| 2007/0188450 A1 | 8/2007 | Hernandez et al. |
| 2007/0268246 A1 | 11/2007 | Hyatt |
| 2007/0290999 A1 | 12/2007 | Cho et al. |
| 2008/0088602 A1 | 4/2008 | Hotelling |
| 2008/0125224 A1 | 5/2008 | Pollatsek |
| 2009/0019357 A1 | 1/2009 | Cudich et al. |
| 2009/0228798 A1 | 9/2009 | Kephart et al. |
| 2009/0239581 A1 | 9/2009 | Lee |
| 2009/0262074 A1 | 10/2009 | Nasiri et al. |
| 2010/0289743 A1 | 11/2010 | Sun et al. |

ELECTRONIC CONTROL APPARATUS AND METHOD FOR RESPONSIVELY CONTROLLING MEDIA CONTENT DISPLAYED ON PORTABLE ELECTRONIC DEVICE

CROSS-REFERENCE TO RELATED APPLICATION

This application is a continuation application of and claims the priority benefit of a prior U.S. application Ser. No. 12/967,401, filed on Dec. 14, 2010, which claims the benefit of U.S. Provisional Application 61/291,117, filed Dec. 30, 2009, which is incorporated herein in its entirety to the extent not inconsistent herewith.

FIELD OF THE INVENTION

The present invention relates to an electronic control apparatus, and more particularly to an electronic control apparatus including a motion sensor module and integrated with a portable electronic device to detect and generate motion sensor signals to responsively control a media content displayed on a display of the portable electronic device and method thereof.

BACKGROUND OF THE INVENTION

Nowadays, more and more mobile electronic device have been widely used in our daily life. These mobile electronic devices are provided with some proper operation interfaces, such as buttons and keypads. Though operating the operation interfaces, users can control the mobile electronic devices to execute more and more function.

In addition to the abovementioned operation interfaces, touch screens are being widely used to serve as a new kind of operation interfaces since they may be implemented external to the mobile electronic device such that the overall thickness of the mobile electronic device may be reduced. Touch screen also offers the freedom to user's operations based on user's intuitional control behavior, creating an user feel friendly and easy-operating environment.

Especially, for the new generation smart mobile electronic devices, such as the smart mobile phones, the smart PDA, smart portable electronic GPS device, etc., the feeling of friendly and easy-operating can be very important to the users while the users may operate such new generation smart portable electronic devices under various operation conditions.

In view of the above, there are still many inconvenient operations associated with such new generation smart mobile electronic devices due to the limitation that almost all of the operations require user's actual and direct touch or pressing actions on the touch screens, which introduces certain degree of unfriendliness and limitations to the users and the operations thereof. For example, considering the function of zoom in/out of a portable electronic device, one must operate the device and the touch screen implemented thereon with fingers to zoom in/out certain display field by swing two fingers on the touch screen.

Moreover, taking the function of displaying front/next image or a first/last image for example, when the users intends to operate the smart mobile phone to display a front/next image or a first/last image from a plurality of images, it is unavoidable for the user to search for the function icons displayed on the touch screens, and then press the positions of the function icons displayed on the touch screen.

Nevertheless, taking the function of field-moving for example, when the users intends to operate the smart mobile phone to display a 360-degree full view image with an overall filed greater than the display field that the smart mobile phone can display, it is also unavoidable for the user to search for the function icons displayed on the touch screens, and then keep in pressing the positions of the function icons displayed on the touch screen to move the display field.

SUMMARY OF THE INVENTION

In view of the shortcomings of the prior arts, there are inconvenient operations associated with portable electronic devices including such as smart phones since almost current operations requires actual or physical touches on a display or touch screens integrated therein. Such limitation requiring direct or physical touches on the display, for example touch screens, may hinder user's interactions in some particular situations such as gaming or media playing and viewing and may too reduce user friendliness of use of the device. One of the objectives of the present invention is to provide an electronic control apparatus to be integrated with or in a portable electronic device including for example smart phone or tablet. Another objective is to provide a control method to responsively control a display or media content on a display of the portable electronic device integrated with the control apparatus comprising a motion sensor module capable of detecting and generating motion sensor signals in response to rotations and/or movements of the portable electronic device and such that the display or media content displayed on the portable electronic device may be displaced or altered in such a predetermined manner responding to the motion sensor signals of the motion sensor module of the control apparatus integrated in the portable electronic device subject to rotations and/or movements. In other words, the electronic control apparatus may comprise a sensing module or a motion sensor module to sense the rotations and/or movements of the portable electronic in order to responsively control the display of the portable electronic device.

According to one embodiment of the present invention, the electronic control apparatus may be integrated or embedded in a portable electronic device for responsively controlling a display of the portable electronic device, in particular a media content on a display field of the display of the portable electronic device. The electronic control apparatus may include a sensing module or a motion sensor module for detecting and generating motion sensor signals and a processing unit for calculating and processing said motion sensor signals. The sensing module is configured to sense a first rotation angle of the portable electronic device and to responsively send out a first rotation sensing signal when the portable electronic device is subject to rotations detected by a first rotation means. The processing unit is electrically connected to the sensing module, preset with a first threshold angle, and embedded with an algorithm means for receiving the first rotation sensing signal to calculate whether the first rotation angle is greater than the first threshold angle. When the first rotation angle is greater than the first threshold angle, the processing unit sends out a zoom in/out signal to control the display to zoom in/out the display field.

A responsive control method is carried out by the electronic control apparatus comprising steps of: presetting a first threshold angle; sensing an first rotation angle of the portable electronic device to accordingly send out a first rotation sensing signal when the portable electronic device is rotated by a first rotation means; receiving the first rotation sensing signal to calculate whether the first rotation angle is greater than the first threshold angle; and sending out a zoom in/out signal to control the display to zoom in/out the display field when the first rotation angle is greater than the first threshold angle.

Preferably, when the display is operated to display a plurality of images, the sensing module further can sense an acceleration value of the portable electronic device to accordingly send out an acceleration sensing signal when the portable electronic device is rotated by a second rotation means. The processing unit can be preset with a first threshold acceleration value, receive the acceleration sensing signal to calculate whether the acceleration value is greater than the first threshold acceleration value, and send out a first page-switch signal to control the display to display a front/next image of the image when the acceleration value is greater than the first threshold acceleration value.

Moreover, the processing unit further can be preset with a second threshold acceleration value greater than the first threshold acceleration value, receive the acceleration sensing signal to calculate whether the acceleration value is greater than the second threshold acceleration value, and send out a second page-switch signal to control the display to display a first/last image of the images when the acceleration value is greater than the second threshold acceleration value.

More preferably, when the display is operated to display a full view image with an overall filed greater than the display field, the sensing module further can sense a second rotation angle of the portable electronic device to accordingly send out an second rotation sensing signal when the portable electronic device is rotated by a third rotation means. The processing unit can be preset with a second threshold angle, receive the second rotation sensing signal to calculate whether the second rotation angle is greater than the second threshold angle, and send out a field-moving signal to control the display to move the display field within the overall field of the full view image when the second rotation angle is greater than the second threshold angle.

It is suggested that the portable electronic device can be a portable electronic phone, a portable electronic PDA or other portable electronic device. It is further suggested that abovementioned first rotation means can be to vertically roll the portable electronic device forwardly or backwardly to generate the first rotation angle; abovementioned second rotation means can be to vertically tilt the portable electronic device along a counterclockwise direction or a clockwise direction to generate the acceleration value; and abovementioned third rotation means can be to horizontally rotate the portable electronic device along a counterclockwise direction or a clockwise direction to generate the second rotation angle.

Comparing with the portable electronic device, such as smart portable electronic phone, as disclosed in prior arts, in the present invention, the sensing module can sense the motion conditions, such as the first rotation angle, the acceleration value, and the second rotation value, of the portable electronic device, to respectively carry out the specified hot functions, such as zoom in/out, switching to a front/next/first/last image, and field-moving. Therefore, it is obvious that through the present invention, the user can operate the portable electronic device to execute the specified hot functions by rotating the portable electronic phone by the specified rotating means, such as the first rotation means, the second rotation means, and the third rotation means as suggested above, so as to make the user feel more friendly and convenient when they operate the portable electronic device.

The devices, characteristics, and the preferred embodiments of this invention are described with relative figures as follows.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

The control apparatus and the control method as provided in accordance with the present invention can be widely adapted to control various types of portable or portable electronic devices. The following content recites different embodiments of the present invention and is for illustrative purposes only to describe principles and technical features as well as technique effects achievable by various embodiments of the present invention.

Figure 1:
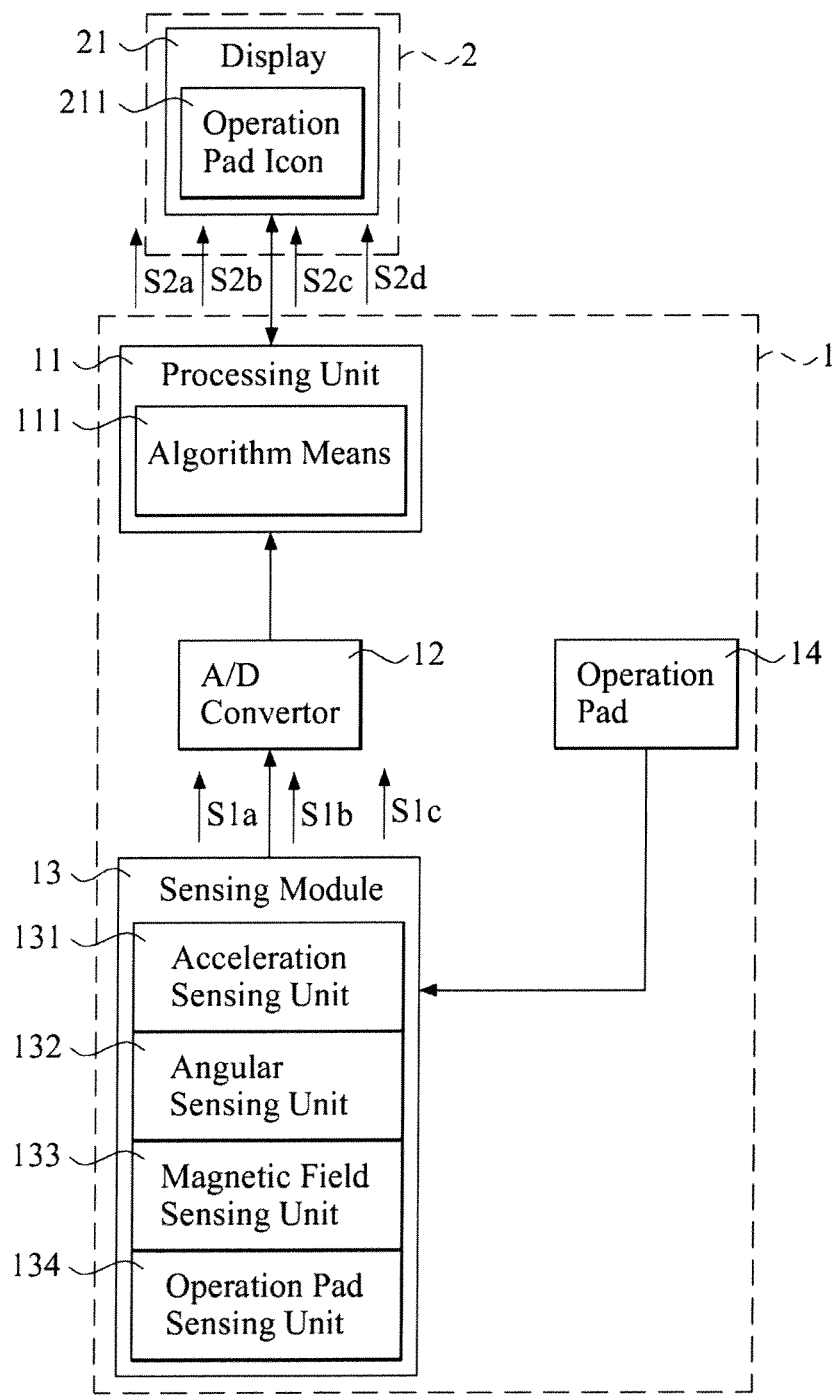
FIG. 1 is a functional diagram illustrating a control apparatus being embedded into a portable electronic device in accordance with a preferred embodiment of the present invention.
Figure 2:
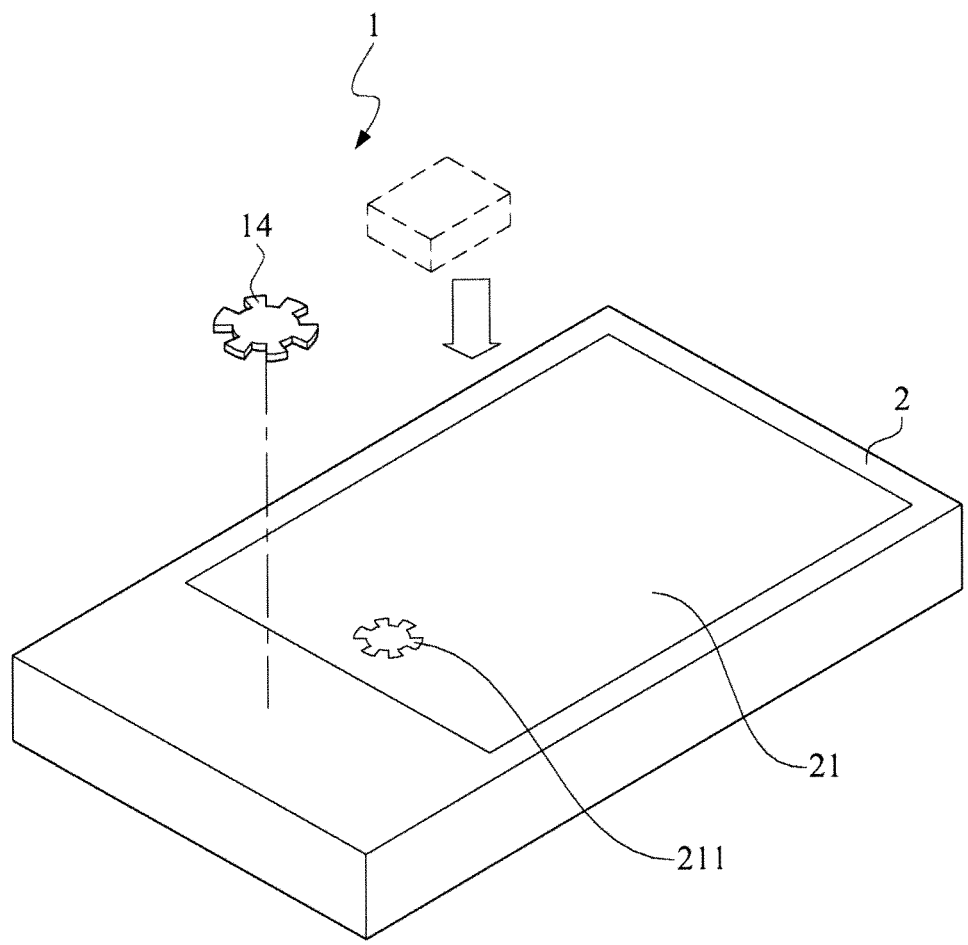
FIG. 2 is a perspective illustrative view of the control apparatus and the portable electronic device in accordance with the preferred embodiment of the present invention.

Referring now to FIG. 1 and FIG. 2, FIG. 1 is a functional diagram illustrating a control apparatus being implemented into a portable electronic device in accordance with one embodiment of the present invention; FIG. 2 is a perspective view of the control apparatus of the present invention integrated in a portable electronic device of the present invention. An electronic control apparatus 1 may comprise a motion sensor module integrated in a portable electronic device 2 for controlling a display 21 of the portable electronic device 2. The portable electronic device 2 may be a smartphone, a PDA, a portable GPS device or other entertainment or media playing, viewing devices. According to one embodiment of the present invention, the electronic control apparatus 1 comprises a processing unit 11, an analogue-to-digital (A/D) signal convertor 12, a sensing module 13 and an operation pad or touch panel 14.

In one embodiment of the present invention, the processing unit 11 may be embedded with an algorithm 111, comprising a preset first threshold angle, a second threshold angle, a first threshold acceleration value and a second threshold acceleration value. Furthermore, the processing unit 11 may be electrically connected to the sensing module 13 via the A/D (analogue to digital) convertor 12, i.e., the A/D signal convertor 12 may be electrically connected to both the processing unit 11 and the sensing module 13.

The sensing module 13 comprises an accelerometer or axial acceleration sensing unit 131, a gyroscope or angular velocity sensing unit 132, a magnetometer or magnetic-field sensing unit 133 and a touch-panel sensor module or operation pad sensing unit 134. In one embodiment, the axial acceleration sensing unit 131 may be for example a gravity sensor (G sensor), the angular velocity sensing unit 132 maybe for example a gyroscope, and the magnetic field sensing unit 133 may be for example a magneto-impedance sensor or a magnetic reluctance sensor. In one embodiment, the operation pad or touch panel 14 may be an integral part of the portable electronic device 2, and an operation pad icon 211 associated with a user-interface (UI) of the display 21 of the portable electronic device 2 may be displayed thereon and serve as an example of said operation pad 14. In other words, it can be understood that in known arts or under common usage of electronic device with a touch-panel, user inputs must be entered or inputted via the operation pad icon and must be carried out on or via the touch panel such that user input or actions to control the display of the electronic device including such as display content zoom in, zoom out, flip, rotate on the display or touch panel may be achieved. As mentioned previously, such limitation on the use of user input and control of a display of electronic device may hinder user's friendliness of use in various applications including gaming, media viewing and playing.

Figure 3A:
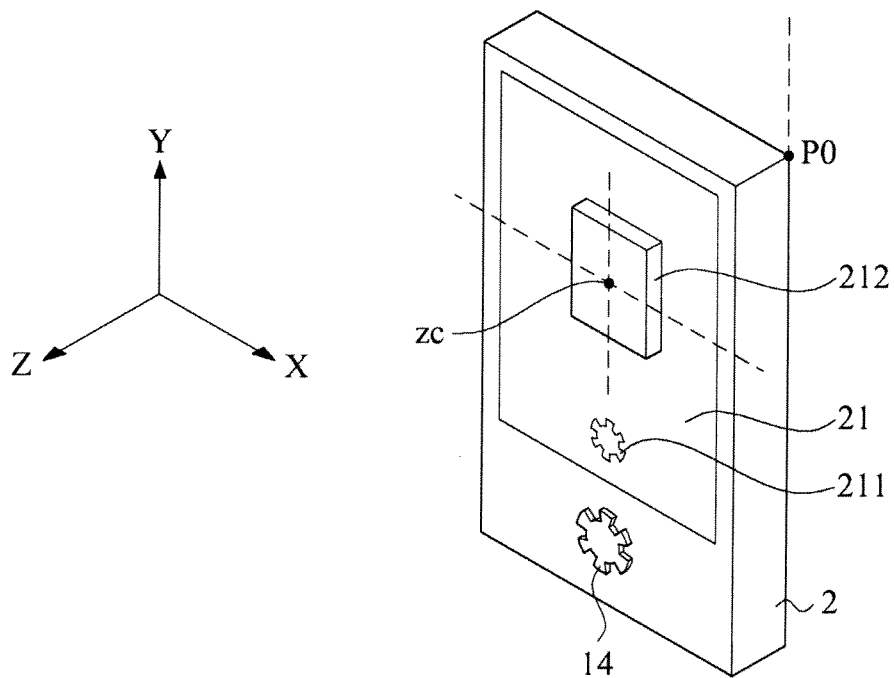
FIG. 3A to 3C illustrate the control method for zooming in/out the display field of the display of the portable electronic device in accordance with the preferred embodiment of the present invention.
Figure 3B:
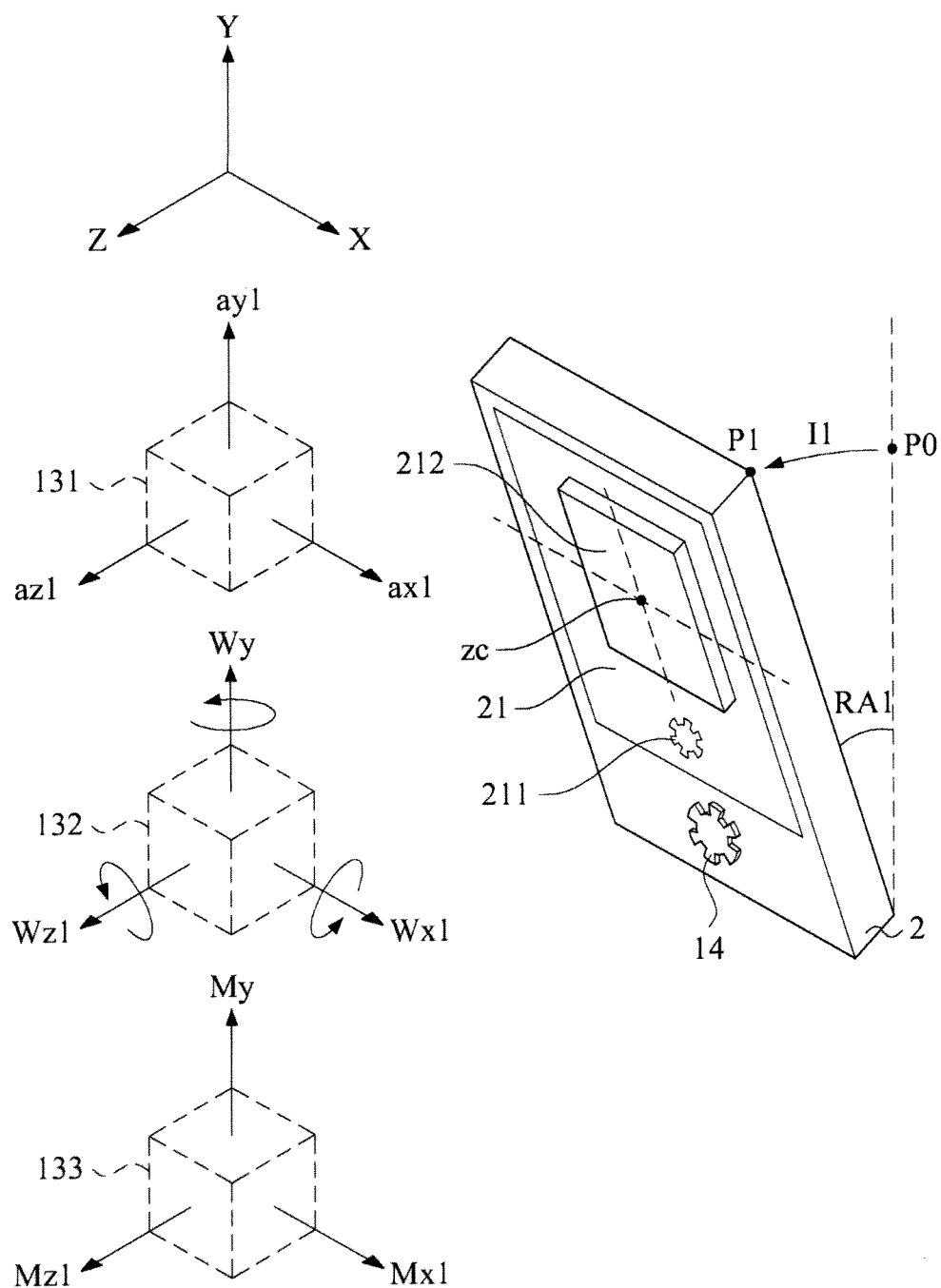

FIG. 3A to FIG. 3B illustrate the control method for zooming in or zooming out the display field of the display of the portable electronic device according to one embodiment of the present invention. The sensing module has a reference coordinate system X-Y-Z. Initially, the display 21 displays an object 212. When a user intends to zoom in the display field of the display 21, he/she can determine a zoom-in center ZC. If the user does not determine the zoom-in/out center ZC, a center point of the display field is preset to be the zoom-in center ZC. Then he/she may then trigger a triggering member such that the portable electronic device of the present in invention may responsively enter a smart operation mode and such that the sensing unit comprising a motion sensor module may sense rotations and/or movements of the portable electronic device integrated with the sensing unit therein in steps described in the following content. In one embodiment, the triggering member may be an example of the abovementioned operation pad 14 or the operation pad icon 211 associated with a user-interface (UI) stored in a register of the portable electronic device and displayed on the display 21 thereof to respond to an user input or selection.

During operation, in one exemplary embodiment, the user may hold the portable electronic device 2 and the portable electronic device 2 may be subject to rotations and/or movements due to external forces exerted by the user such that the rotations and/or movements of the portable electronic device 2 may be detected by a first rotation means. During a smart operation mode as mentioned previously, the axial acceleration sensing unit or accelerometer 131 may be configured to sense or detect three axial acceleration components Ax1, Ay1 and Az1; the angular velocity sensing unit or gyroscope 132 may be configured to sense or detect three angular velocity components Wx1, Wy1 and Wz1; and the magnetism sensing unit or magnetomer 133 may be configured to sense three magnetic field deviation components Mx1, My1 and Mz1. The axial acceleration sensing components Ax1, Ay1, Az1, the angular velocity sensing components Wx1, Wy1, Wz1, and the magnetic field sensing components Mx1, My1 and Mz1 may be categorized as or combined in one form of signal such as a first rotation sensing signal S1*a* comprising said sensing components; and the first rotation sensing signal S1*a* may be transmitted to the processing unit 11. The first rotation sensing signal S1*a* may be converted by the A/D signal convertor 12 prior to the transmission to the processing unit 11 such that the first rotation sensing signal S1 may be converted from an analogue signal to a digital signal for further process or calculation of rotation angles by the processing unit 11.

Figure 3C:
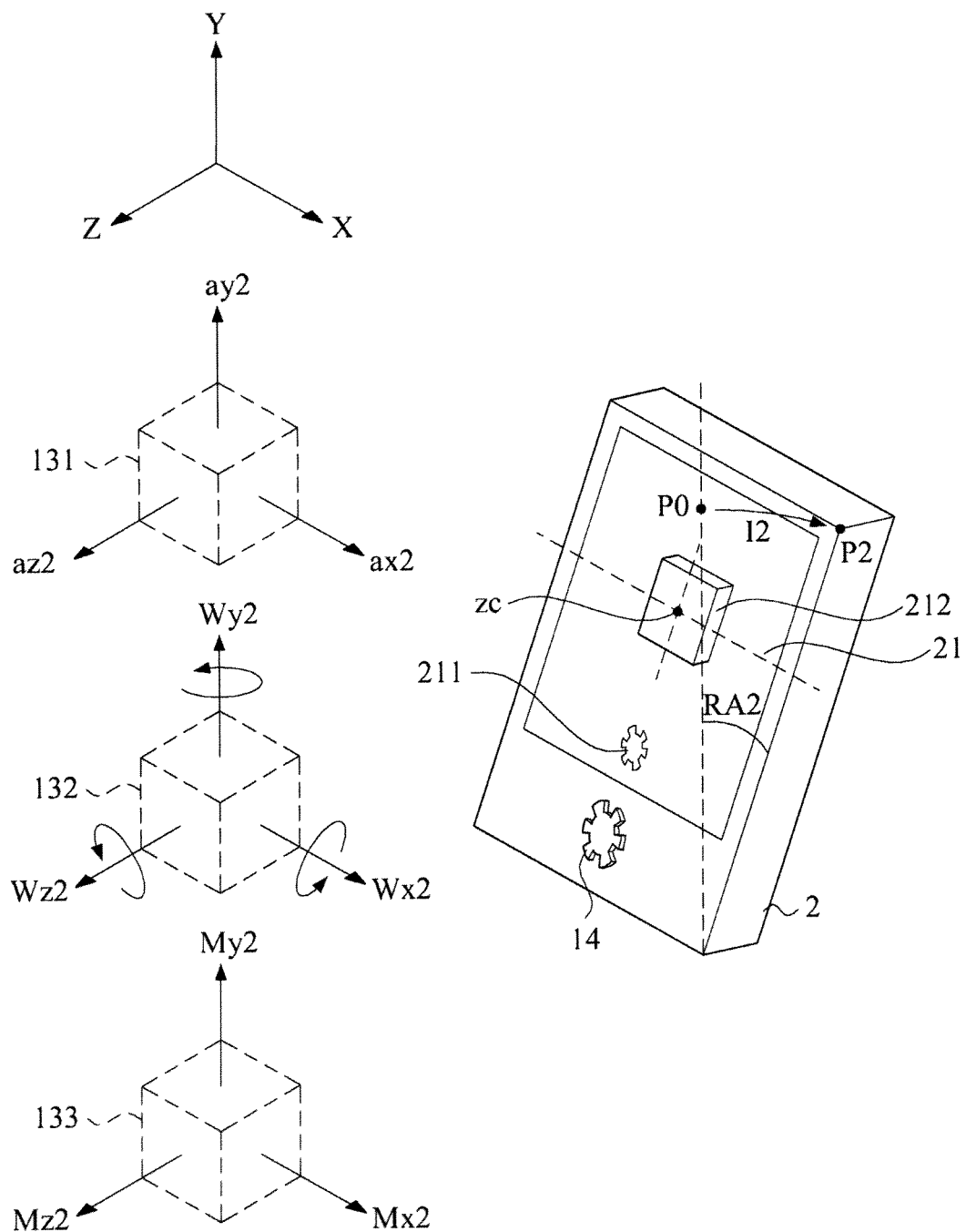

As shown in FIG. 3A-3C, an exemplary reference coordinate may be denoted by a x-axis, y-axis and z-axis. In addition, with reference to a universal coordinate system widely adapted in navigation, a rotation about the x-axis may be known as a pitch, a rotation about the y-axis may be a yaw and a rotation about the z-axis may be a roll. In one embodiment, the first rotation means may be configured to sense or detect a rotation of a pitch or about the x-axis as shown in the figure, of the portable electronic device 2 in a forward and backward manner to generate a first rotation angle RA1, i.e., the portable electronic device 2 may be positioned or held initially in a direction vertical to the horizontal plane such that the portable electronic device 2 may be rotated about a horizontal axis or, to be more specific, forwardly and backwardly along a forward rolling direction I1 as shown in the figure and one corner of the portable electronic device may be moved from an initial point P0 to another point P1. It can, however, be understood that other coordinate systems of yaw, pitch and roll may too be possible; any changes of denotation shall to be considered within the scope and spirit of the present invention.

To responsively control a display content or a media content stored in a register of the portable electronic device 2 of the present invention, the processing unit 11 may send out a control signal in response or corresponding to the rotation angle or rotation sensing signals received and calculated thereby. When the processing unit 11 receives the first rotation sensing signal S1*a*, the algorithm means 111 may calculate the rotation angle RA1 and further determine whether the rotation angle RA1 is greater than the first threshold angle. If the rotation angle RA1 is greater than the first threshold angle, the processing unit 11 then sends out a zoom-in signal S2*a* to control the display 21 to zoom in the display field, and then the object 212 can be enlarged.

Similarly, in one example of responsively zooming out the display content on the display field of the display 21, the processing unit 11 may too output a control signal based on rotation and/or movement of the portable electronic device 2 detected by the first rotation means. In one embodiment of the present invention and preferably operating in the abovementioned smart operation mode, the acceleration sensing unit 131 may be configured to sense three acceleration components Ax2, Ay2 and Az2; the angular sensing unit 132 may be configured to sense three angular velocity components Wx2, Wy2 and Wz2; and the magnetic field sensing unit 133 may be configured to sense three magnetic field deviation components Mx2, My2 and Mz2. The acceleration components Ax2, Ay2, Az2, the angular velocity components Wx2, Wy2, Wz2, and the magnetic field deviation components Mx2, My2 and Mz2 can be sent out via the first rotation sensing signal S1a, and the first rotation sensing signal S1a may be transmitted to the processing unit 11. In one embodiment, the first rotation means may be configured to detect a rotation of a pitch of the portable electronic device 2 about the x-axis as shown in the figure in a backward manner to generate another first rotation angle RA2. The portable electronic device 2 may be positioned or held in a direction vertical to the horizontal plane in initial and the portable electronic device 2 may be pitched or rotated about the x-axis in a backward manner; the rolling direction I2 as shown in the figure indicates movement of a corner of the portable electronic device move from an initial point P0 to another point P2. During an explanatory operation of the present invention, the processing unit 11 may be embedded with an algorithm for calculation and determination of rotation angles based on rotation sensing angle signals received from the sensing module. When the processing unit 11 receives the first rotation sensing signal S1a, the processing unit 11 embedded with the algorithm means 111 may calculate the rotation angle RA2 and further determine whether the rotation angle RA2 is greater than the first threshold angle. If the rotation angle RA2 is greater than the first threshold angle, the processing unit 11 may then send out a zoom out signal S2a to control the display 21 to zoom in the media content displayed on the display field of the display 21.

Figure 4A:
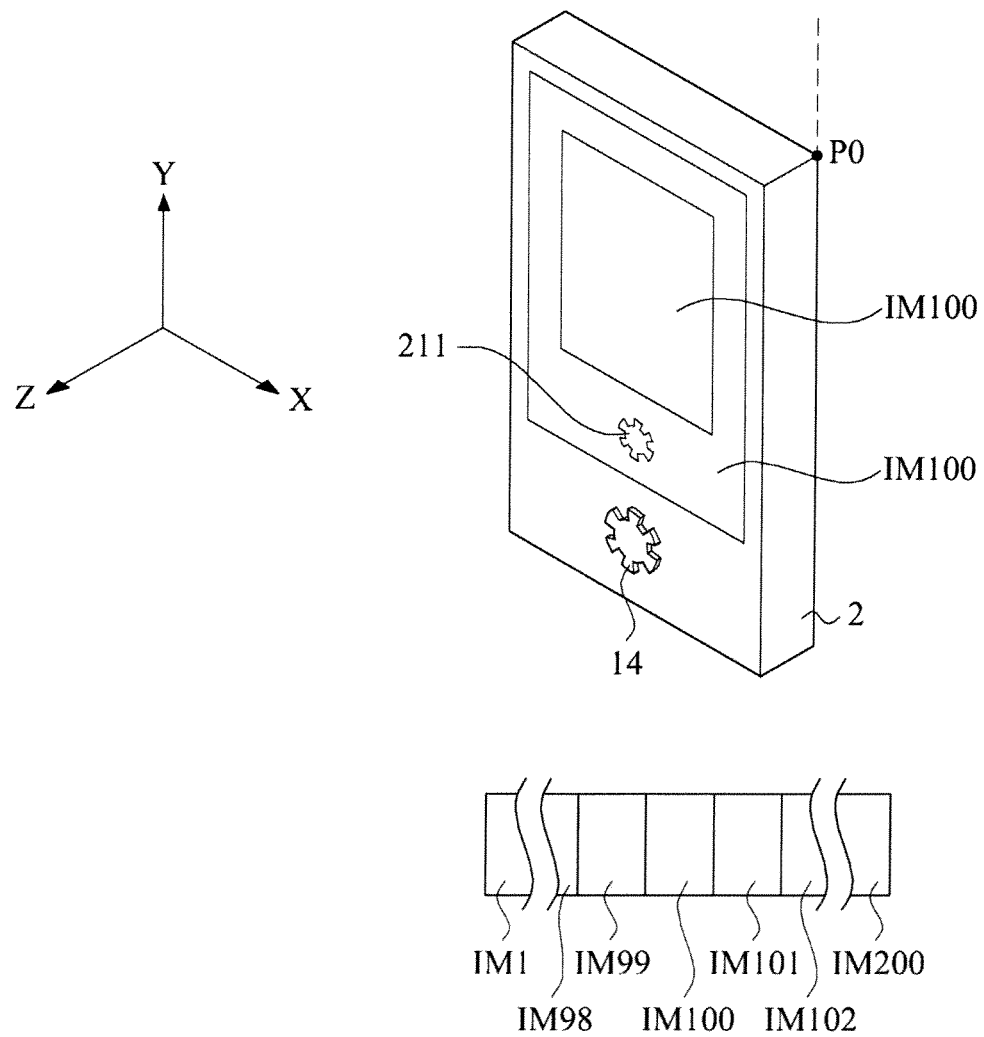
FIG. 4A to 4C illustrate the control method for switching to a front/next image in accordance with the preferred embodiment of the present invention.
Figure 4B:
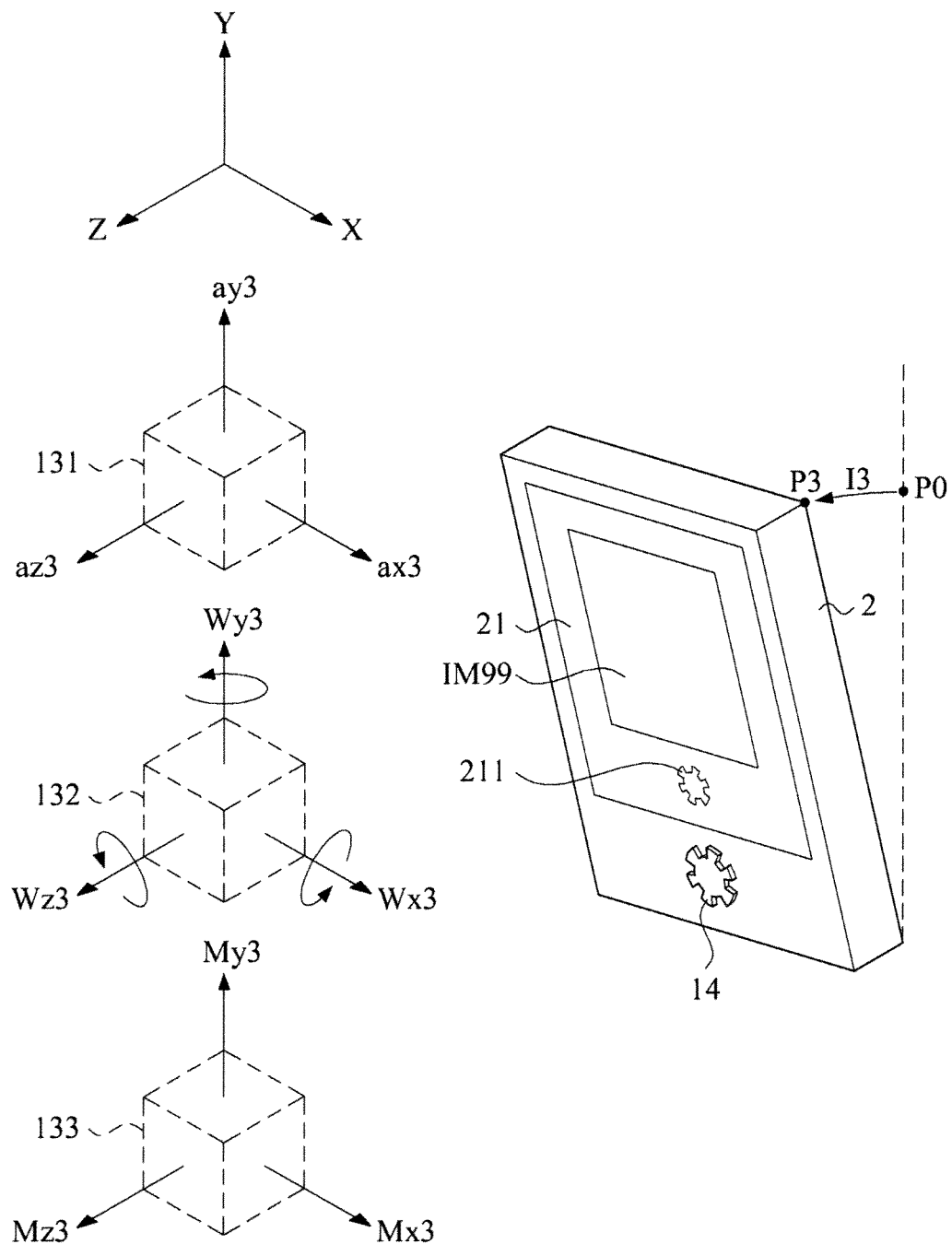
Figure 4C:
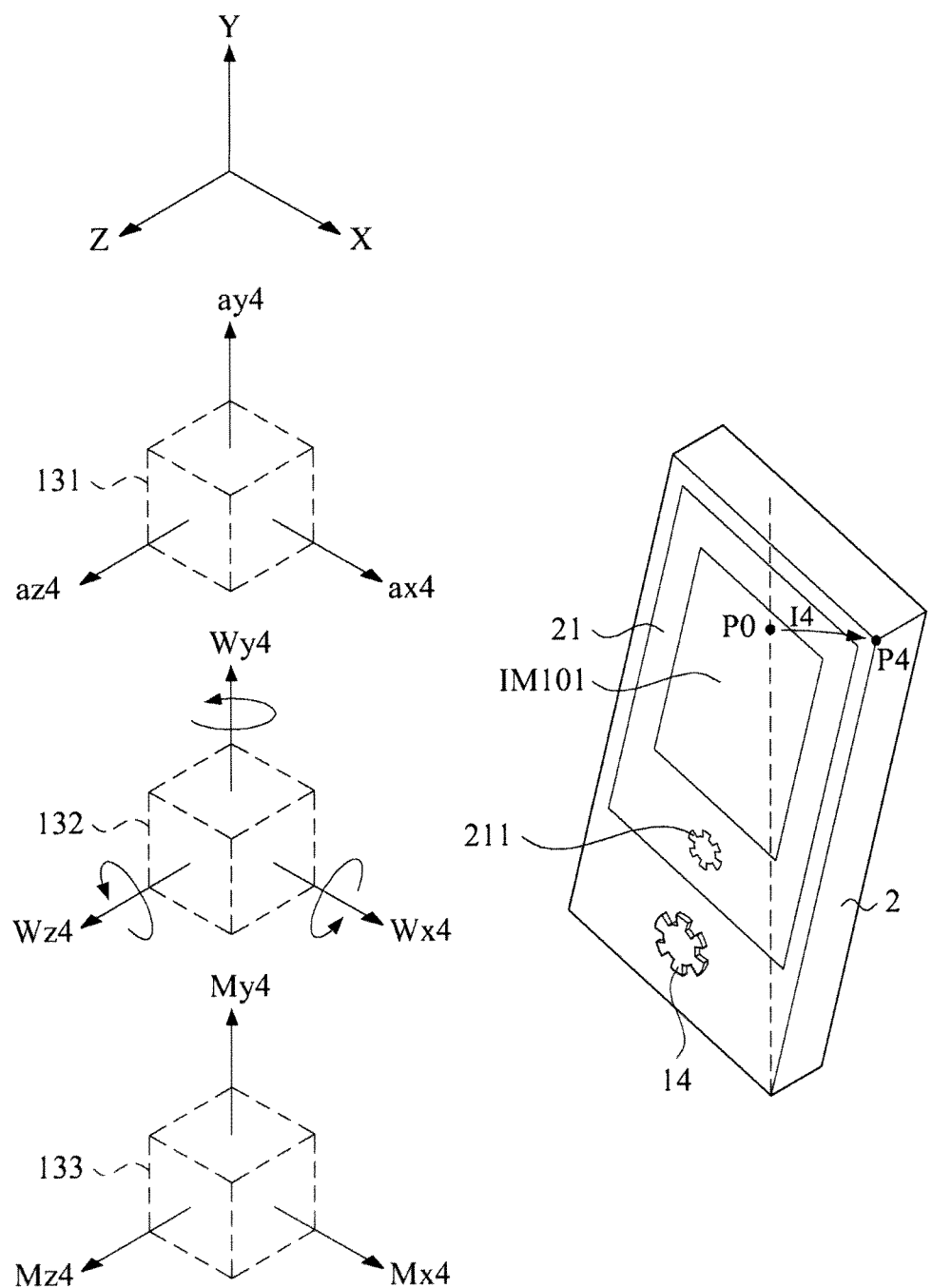

FIG. 4A to 4C show an exemplary embodiment of the control method of the present invention in which pages or images of a media content stored in a register of the portable electronic device 2 of the present invention is flipped to display a previous or next page/image of the media content on display thereof. In one embodiment, The portable electronic device 2 also can be operated to display a plurality of images IM1.aboutIM200, which may too be part of a media content or display content comprising such as image files stored in a register of the portable electronic device 2; the media content may too be for example web-site pages, video, document, music.

During an explanatory operation example of the present invention, And preferably in a smart operation mode, the user may exert an external force to rotate the portable electronic device such that the rotation may result in making the display 21, initially displaying for example an image IM100, to flip a image of a media content on the display such as the front image IM99 and wherein the rotation of the portable electronic device 2 may be detected by a second rotation means. At this moment under the smart operation mode, the acceleration sensing unit 131 can sense three acceleration components Ax3, Ay3 and Az3; the angular sensing unit 132 can sense three angular velocity components wx3, wy3 and wz3; and the magnetic field sensing unit 133 can sense three magnetic field deviation components Mx3, My3 and Mz3. The acceleration components Ax3, Ay3, Az3, the angular velocity components Wx3, Wy3, Wz3, and the magnetic field deviation components Mx3, My3 and Mz3 may categorized as or combined in one form of signal such as the acceleration sensing signal S1b for further transmission to and process by the processing unit 11. The acceleration sensing signal S1b may be transmitted to the processing unit 11. Likewise, in one embodiment, the second rotation means may be configured to detect a rotation of a yaw, such as the rotation about the y-axis as shown in the figure, of the portable electronic device 2 and may be for example in a counterclockwise direction I3 to generate an acceleration value. In other words, in one embodiment, the portable electronic device 2 may be positioned or held in a direction vertical to the horizontal plane as shown in the figure and may be yawed such that one corner of the portable electronic device may be moved from an initial point P0 to another point P3 as shown in the figure. As the processing unit 11 receives the acceleration sensing signal S1b from the sensing module, the processing unit 11 embedded with an algorithm means 111 may then calculate the acceleration value and further determine whether the acceleration value is greater than the first threshold acceleration value. If the acceleration value is greater than the first threshold acceleration value, the processing unit 11 then sends out a first page-switch signal S2b to control the media content on the display field of the display 21 to display for example the front image IM99.

Likewise, in another example of the present invention, a user may exert a force on the portable electronic device 2 to cause it to rotate about a y-axis to make a yawing of the device 2. While being subject to the such rotation of yawing, the processing unit 11 integrated therein may calculate and determine the yaw angle and to send out a display control signal such that the media content displayed on the display field of the display 21 may flip to a next page or image IM101; and wherein the rotation of the portable electronic device 2 may be detected by the second rotation means. In a smart operation mode, the acceleration sensing unit 131 may be configured to sense three acceleration components Ax4, Ay4 and Az4; the angular sensing unit 132 may be configured to sense three angular velocity components Wx4, Wy4 and Wz4; and the magnetic field sensing unit 133 may be configured to sense three magnetic field deviation components Mx4, My4 and Mz4. The acceleration components Ax4, Ay4, Az4, the angular velocity components Wx4, Wy4, Wz4, and the magnetic field deviation components Mx4, My4 and Mz4 may be categorized as or combined in one form of signal such as the acceleration sensing signal S1b. The acceleration sensing signal S1b may be further transmitted to and processed by the processing unit 11. In one embodiment, the second rotation means may be configured to detect a rotation of a yaw of the portable electronic device 2 about a y-axis in a clockwise direction I4 to generate another acceleration value. As shown in the figure, the clockwise direction I4 rotation of the yaw may cause a corner of the portable electronic device to move from an initial point P0 to another point P4. When the processing unit 11 receives the acceleration sensing signal S1b, the processing unit 11 embedded with an algorithm means 111 may be configured to calculate the acceleration value and further determine whether the acceleration value is greater than the first threshold acceleration value. If the acceleration value is greater than the first threshold acceleration value, the processing unit 11 may then send out a first page-switch signal S2b to control the media content on the display filed of the display 21 to display a change of image of the media content such as the displaying of a next page or image IM101 changed or switched from a previous page or image.

Figure 5A:
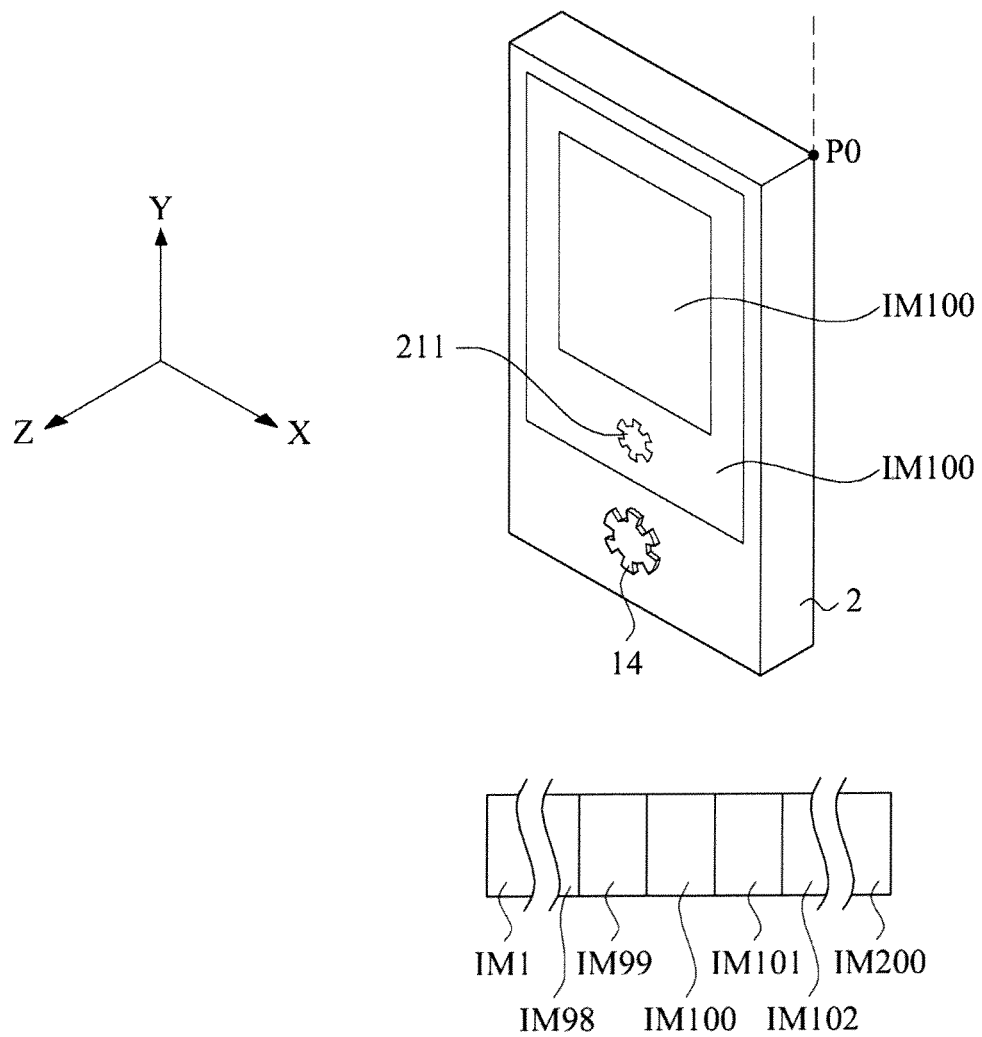
FIG. 5A to 5C illustrate the control method for switching to a first/last image in accordance with the preferred embodiment of the present invention.
Figure 5B:
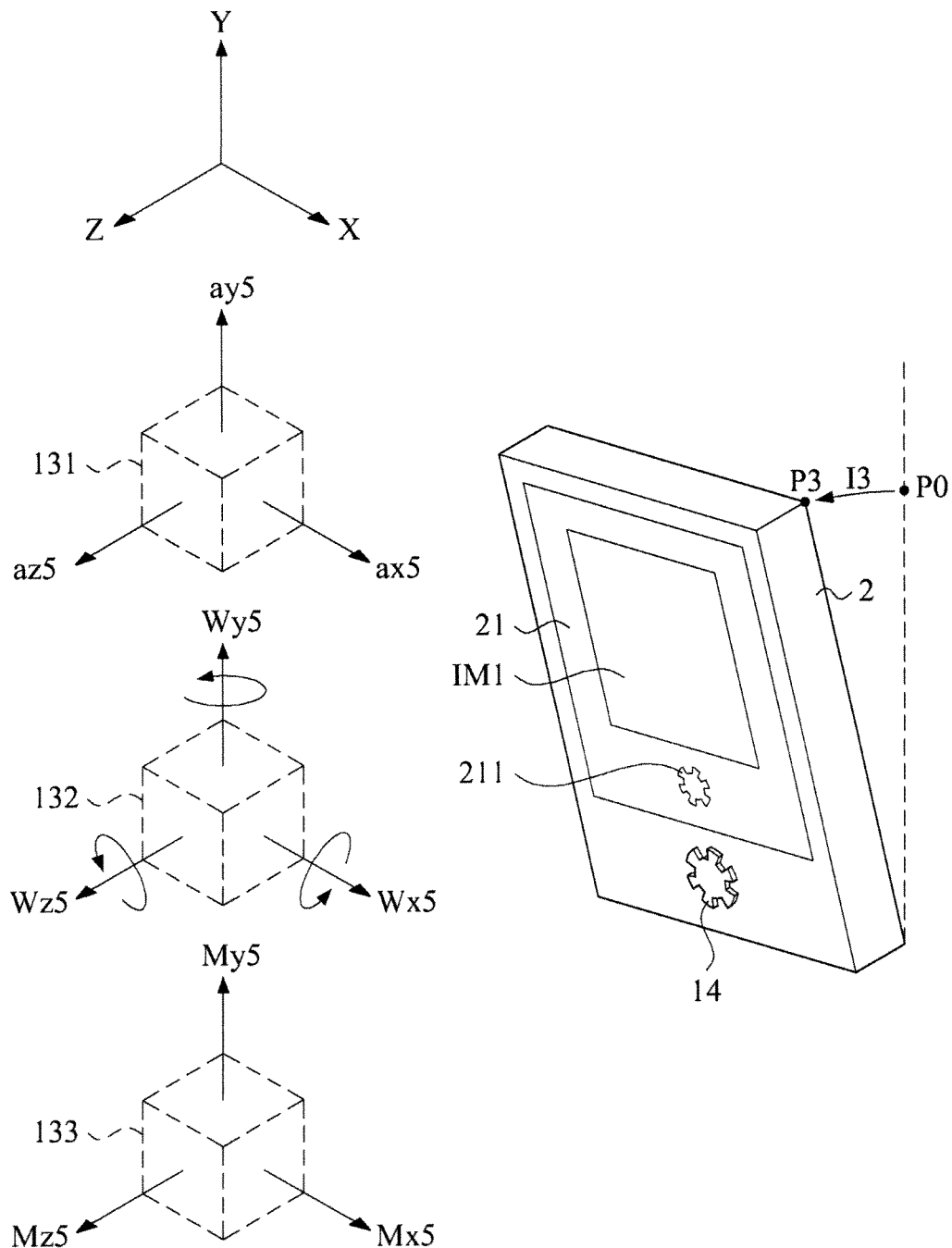
Figure 5C:
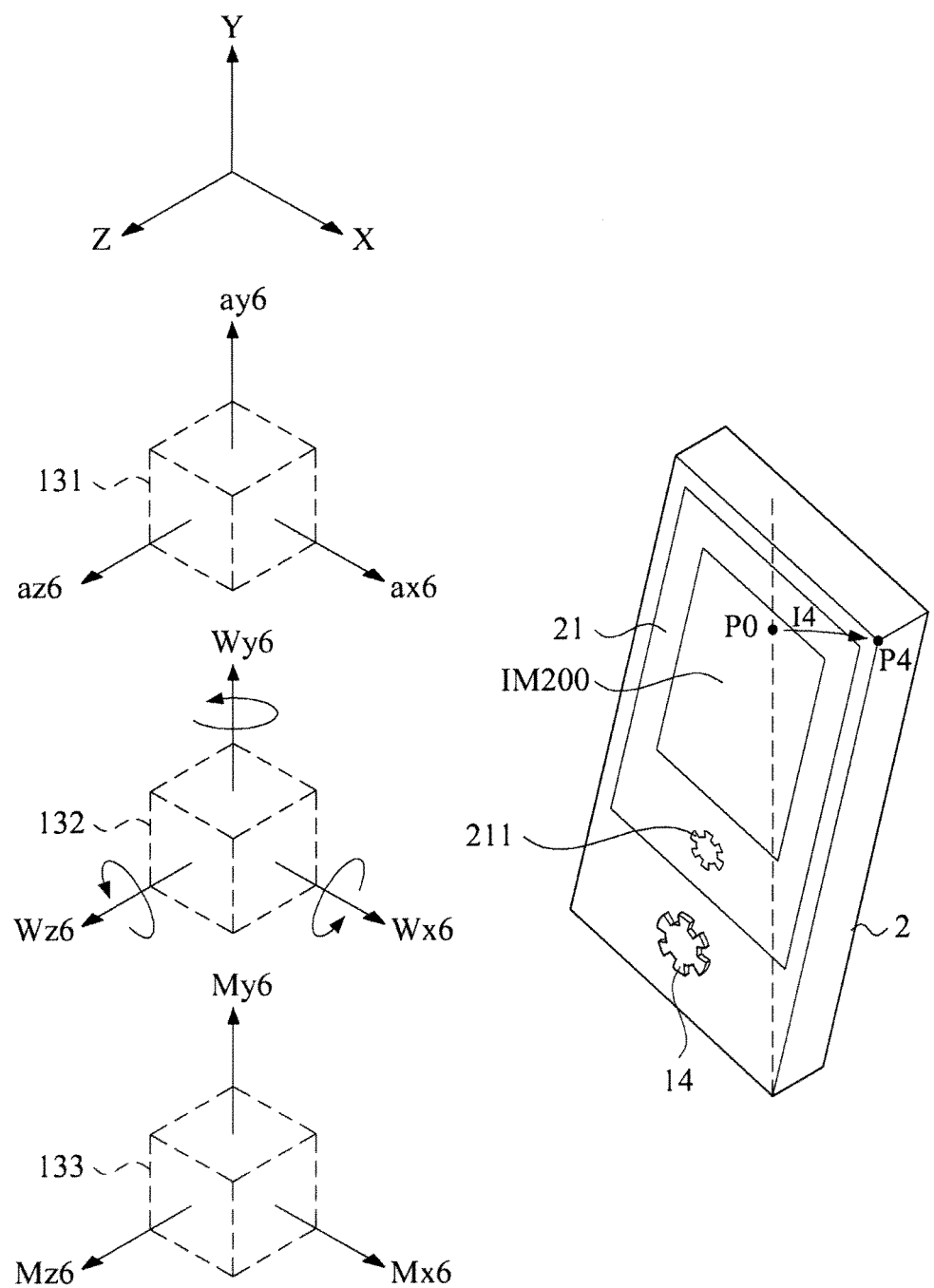

FIG. 5A to 5C show an explanatory embodiment of a responsive control method of the present invention in which a media content on the display field of the display 21 may be responsively altered or changed to show a first or last image of the media content. Likewise and with reference to the above description, a user may exert a force to rotate the portable electronic device 2 and such rotation may be detected by the abovementioned second rotation means. The acceleration sensing unit 131 may be configured to sense three acceleration components Ax5, Ay5 and Az5; the angular sensing unit 132 may be configured to sense three angular velocity components Wx5, Wy5 and Wz5; and the magnetic field sensing unit 133 may be configured to sense three magnetic field deviation components Mx5, My5 and Mz5. The acceleration components ax5, ay5, az5, the angular velocity components wx5, wy5, wz5, and the magnetic field deviation components Mx5, My5 and Mz5 may be categorized as or combined in one form of signal such as the acceleration sensing signal S1$b$. The acceleration sensing signal S1$b$ may be transmitted to and processed by the processing unit 11. In one embodiment, the second rotation means may be configured to detect a rotation about the y-axis as shown in the figure, or yawing, of the portable electronic device 2 and for example in a counterclockwise direction I3 to generate a greater acceleration value. When the processing unit 11 receives the acceleration sensing signal S1$b$, the processing unit 11 embedded with an algorithm means 111 may calculate the acceleration value and further determine whether the acceleration value is greater than the second threshold acceleration value. If the acceleration value is greater than the second threshold acceleration value, the processing unit 11 may then send out a second page-switch signal S2$c$ to control the media content on the display field of the display 21 to display for example a first image IM1 of the media content. Similarly, in another embodiment, upon receiving the acceleration sensing signal S1$b$, the processing unit 11 embedded with the algorithm means 111 may calculate the acceleration value and further determine whether the acceleration value is greater than the second threshold acceleration value. If the acceleration value is greater than the second threshold acceleration value, the processing unit 11 sends out a second page-switch signal S2$c$ to control the media content on the display field of the display 21 to display for example the last image IM200 of the media content stored in the register of the portable electronic device.

Figure 6A:
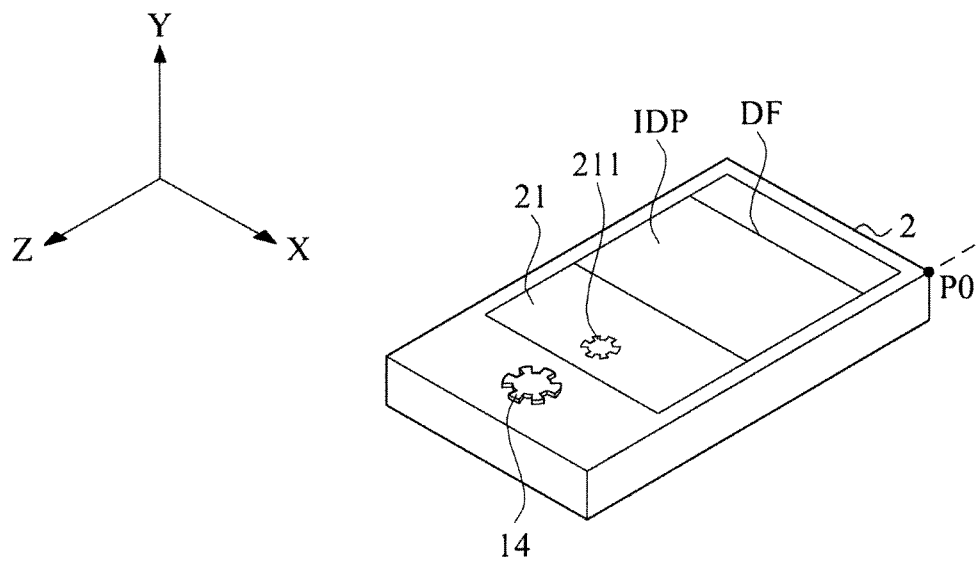
FIG. 6A to 6C illustrate the control method for moving display field when displaying a full view image in accordance with the preferred embodiment of the present invention.
Figure 6A:
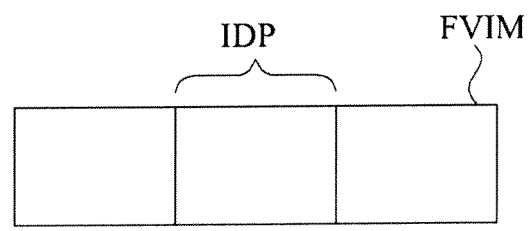
Figure 6B:
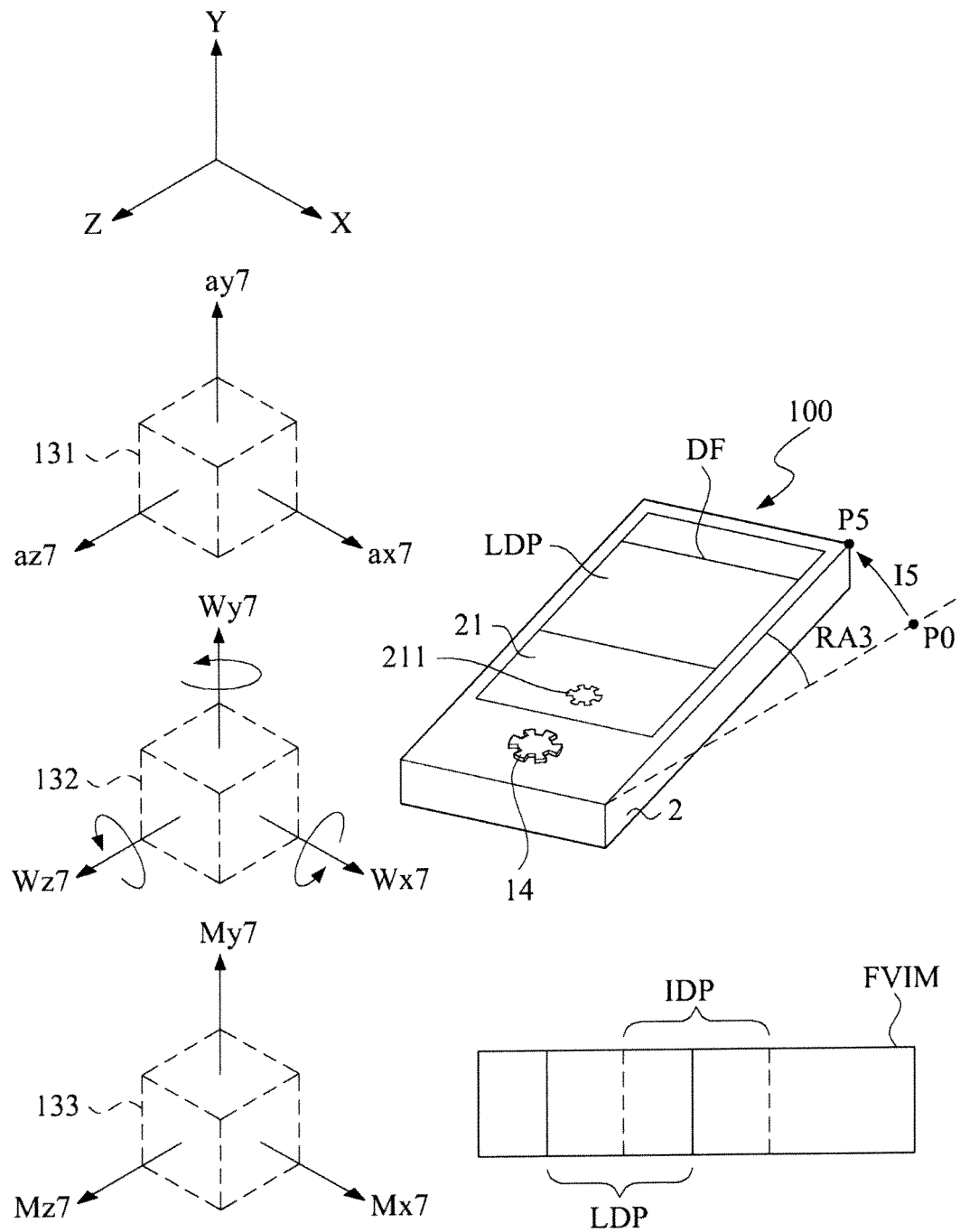
Figure 6C:
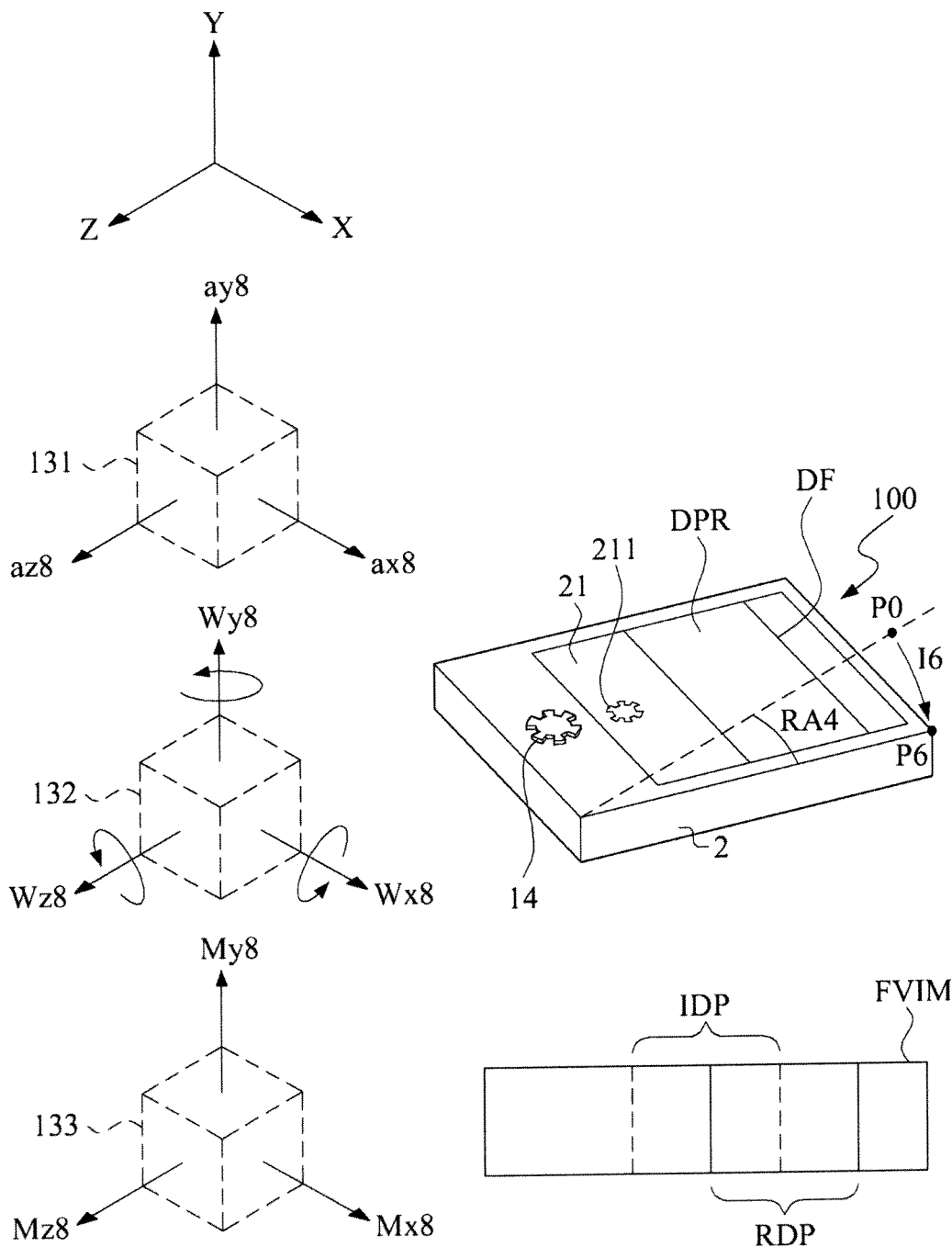

Please refer to FIG. 6A to 6C. According to an explanatory embodiment of a responsive control method of the present invention, in which a media content stored in a register of the portable electronic device 2 and displayed on a display field of the display 21 may be controlled to be displaced such that a full-view image or page of the media content may show different portions thereof in response to motion sensor signals received from a sensing module integrated in the device of the present invention. In another embodiment, the full view image FVIM can be a 360-degree full view of an image of the media content. In still yet another embodiment, a media content of a non-full view image on the display field DF of the display 21 may too be enlarged or switched to a full-view image FVIM thereof in response the abovementioned motion sensor signals received from the sensing module and processed by the processing unit 11 integrated therein.

In one embodiment and during operation of the present invention, a user may exert an external force on the portable electronic device 2 to rotate the device about an axis and a media content displayed on the display field of the display 21 thereof may responsively move from an initial display part IPD to another display part such as a left display part LPD; wherein the rotation of the portable electronic device 2 of the present invention may be detected by a third rotation means. The acceleration sensing unit 131 of a sensing module may be configured to sense three acceleration components Ax7, Ay7 and Az7; the angular sensing unit 132 may be configured to sense three angular velocity components Wx7, Wy7 and Wz7; and the magnetic field sensing unit 133 may be configured to sense three magnetic field deviation components Mx7, My7 and Mz7. The acceleration components Ax7, Ay7, Az7, the angular velocity components Wx7, Wy7, Wz7, and the magnetic field deviation components Mx7, My7 and Mz7 may be categorized as or combined in one signal form as a second rotation sensing signal S1$c$. The second rotation sensing signal S1$c$ may then be transmitted to and further processed by the processing unit 11. In one embodiment, the third rotation means may be configured to detect a rotation of a roll, such as about the z-axis as shown in the figure, of the portable electronic device 2 and for example in a counterclockwise direction I5 as shown to generate a second rotation angle RA3. As shown in the figure, the portable electronic device 2 may be held in a planer position to roll on a certain axis. It can be understood that different coordinate system and denotations are also possible. For example, according to an universal coordinate system in navigation, a roll may be defined as a rotation about a z-axis. Therefore, in another embodiment, the portable electronic device 2 of the present invention may be rolled about the z-axis in for example a counterclockwise direction I5 to such that a corner of the portable electronic device may move from an initial point P0 to another point P5. Upon receiving the second rotation sensing signal S1$c$, the processing unit 11 embedded of an algorithm means 111 may calculate the second rotation angle RA3 and further determine whether the second rotation angle RA3 is greater than the second threshold angle. If the second rotation angle RA3 is greater than the second threshold angle, the processing unit 11 may then send out a field-moving signal S2$d$ to control the display 21 to display different portions of a full-view image or page of the media content on the display filed of the display 22, for example responsively moving the media content to show or display the left display part LPD of the full view image FVIM thereof. Similarly, the processing unit 11 may too send out a field-moving signal S2$d$ to control the media content on the display field of the display 21 to show or display the right display part RPD of the full view image FVIM thereof.

Figure 7A:
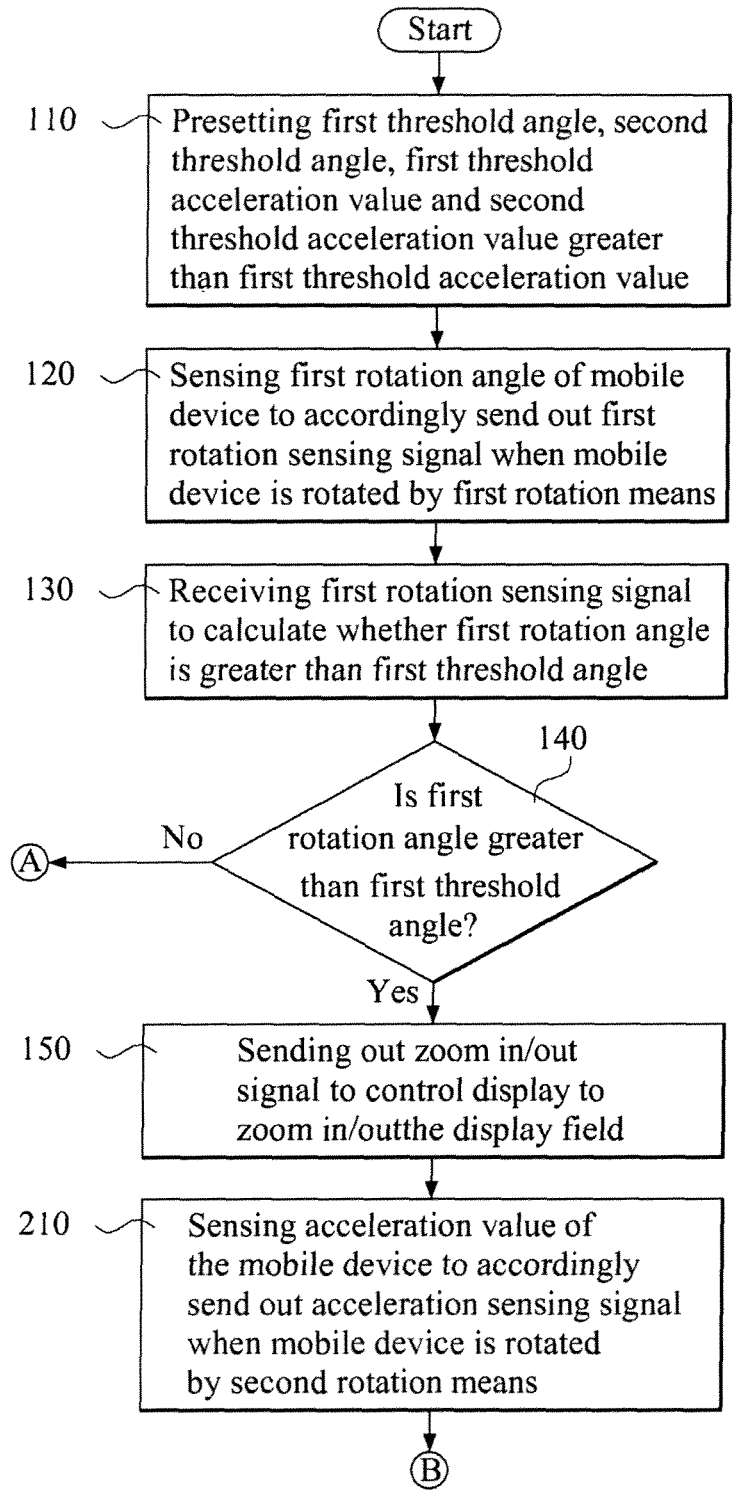
FIG. 7A to FIG. 7C illustrate a simplified flowchart of the control method for zooming in/out the display field, switching to a front/next image, switching to a first/last image, and moving display field.
Figure 7B:
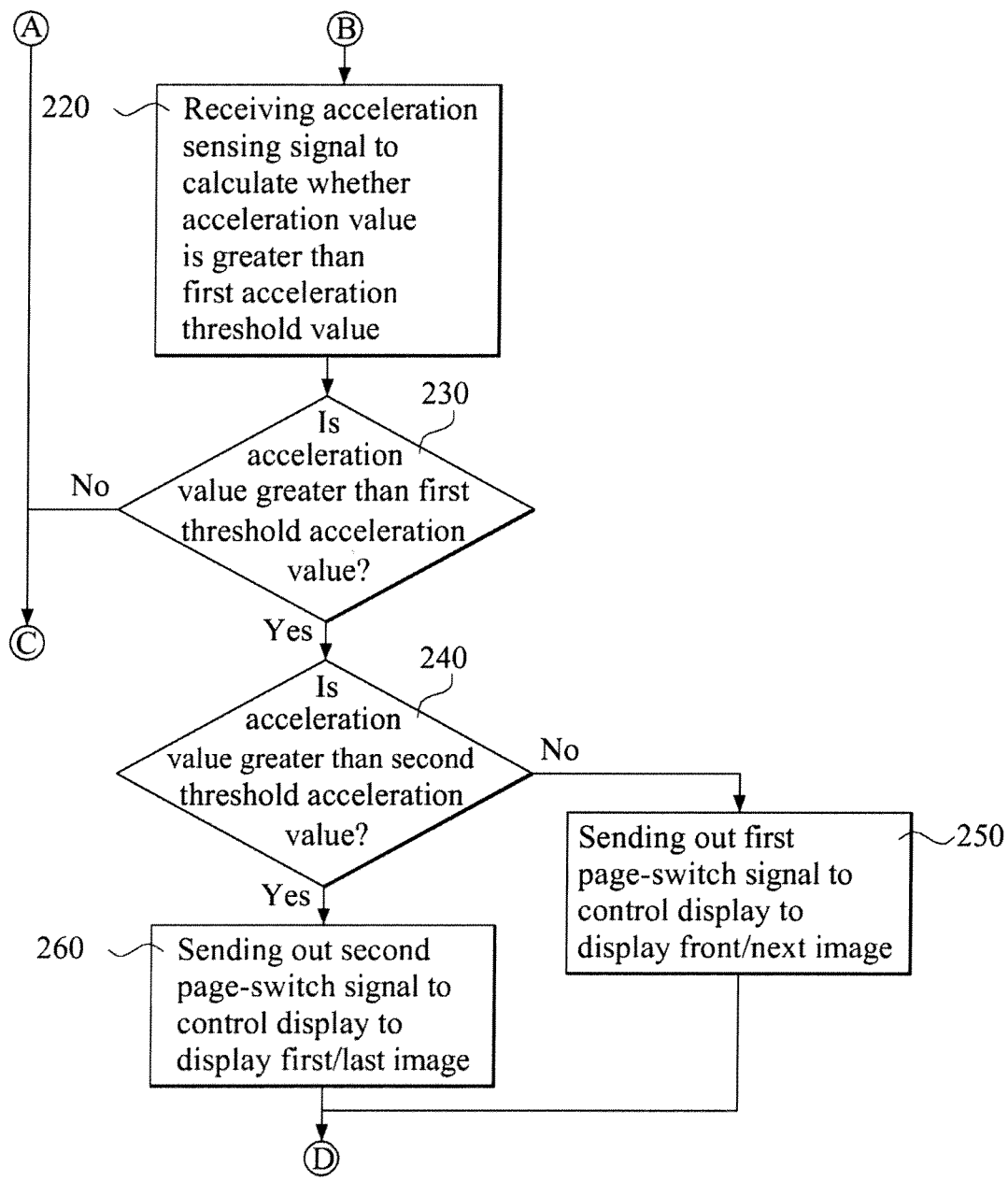
Figure 7C:
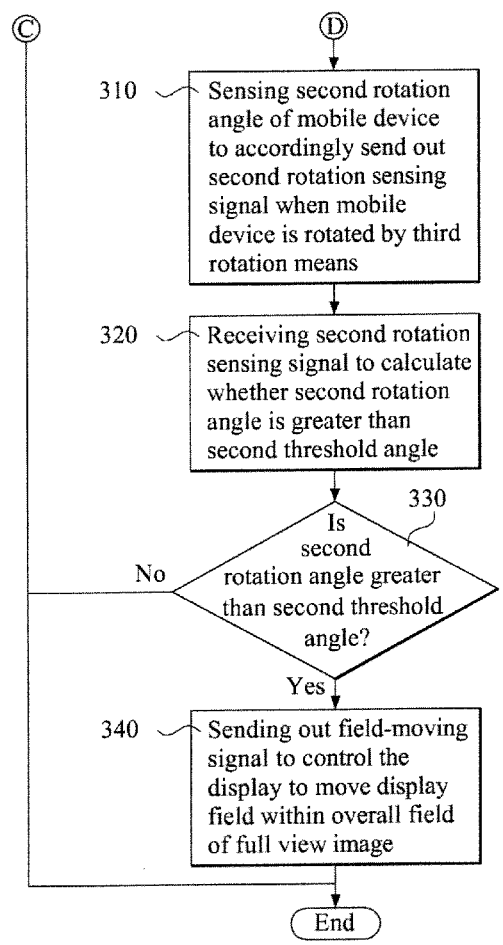

FIG. 7A to FIG. 7C show an illustrative flowchart of a responsive control method of the present invention in which a media content on a display field of a display 21 of the portable electronic device 2 of the present invention carries out the abovementioned zooming in or zooming out of the media content, flipping to a previous or next image/page, switching to a first or last image/page, and displacing different portions of a full-view image on a display field of a display of the portable electronic device of the present invention. In one embodiment, the control method may be performed by a portable electronic device embedded with a control apparatus comprising motion sensors or sensing module, in particular the method may be preferably carried out by a processing unit integrated therein. The control method may comprise a preset first threshold angle, a second threshold angle, a first threshold acceleration value and a second threshold acceleration value that may be greater than first threshold acceleration value as shown in step 110. When executing the function of zooming in/out a media content on a display field, a sensing module may first sense or detect the first rotation angle RA1 or RA2 of a portable electronic device 2 and may send out a first rotation sensing signal S1$a$ in response to a rotation of the portable electronic device 2 detected by a first rotation means (step 120). Upon receiving said first rotation sensing signal S1$a$, a processing unit 11 embedded with an algorithm and integrated in portable electronic device 2 as well as electrically connected to the sensing module may then calculate and determine whether the first rotation angle RA1 is greater than the first threshold angle (step 130). In another embodiment, the method may also include the step of determining whether the first rotation angle RA1 or RA2 is greater than the first threshold angle (step 140). If the first rotation angle RA1 or RA2 is greater than the first threshold angle, the processing unit may then send out a display control signal or a zoom in/out signal S2a to responsively control said media content stored in the register of the portable electronic device 2 to zoom in or zoom out the media content on the display field (step 150).

In another embodiment of the present invention, a responsive control method to alter a media content displayed on a display field of a display of a portable electronic device integrated with a processing unit and a sensing module is explanatory illustrated. In other to flip to a previous or next image/[age or switching to a first or last image/page of the media content stored therein and displayed on the display field, an acceleration value of the portable electronic device may be sensed or detected by the sensing module an acceleration sensing signal S1b may be transmitted to and processed by a processing unit as a rotation of the portable electronic device is detected by a second rotation means (step 210). Following which and upon receiving the acceleration sensing signal, the processing unit embedded with an algorithm may perform a calculation and determine whether the acceleration value is greater than the first acceleration threshold value (step 220). In another embodiment, the processing unit may too determine whether the acceleration value is greater than first threshold acceleration value (step 230). If the acceleration value is greater than the first threshold acceleration value, the processing unit may further determine whether the acceleration value is greater than the second threshold acceleration value (step 240). If the acceleration value is not greater than the second threshold acceleration value, the processing unit may then send out a display control signal or a first page-switch signal S2b to control the media content on the display field of the display 21 and for example to display or flip to a previous or next image IM99 or IM101 (step 250). If the acceleration value is greater than the second threshold acceleration value, is the processing unit may then send out a second page-switch signal S2c to control the media content on the display field of the display 21 to display or switch to a first or last image IM1 or IM200 (step 260).

In still another embodiment of the present invention, a responsive control method may be utilized by a portable electronic device 2 integrated with a sensing module comprising motion sensors and a processing unit to responsively displace a media content on a display field of a display 21 of the device, and in particular, to sense a second rotation angle RA3 or RA4 of the portable electronic device 2 and to transmit a second rotation sensing signal S1c as a rotation of the portable electronic device 2 is detected by a third rotation means (step 310). In one embodiment, after step 310, and upon receiving the second rotation sensing signal S1c, the processing unit embedded with an algorithm may then calculate and determine whether the second rotation angle RA3 or RA4 is greater than second threshold angle (step 320); the processing unit may too further determine whether the second rotation angle RA3 or RA4 is greater than second threshold angle (step 330). If the second rotation angle RA3 or RA4 is greater than second threshold angle (step 330), the processing unit of the portable electronic device of the present invention may send out a field-moving or displacement signal S2d of a display control signal to control the media content on the display filed of the display 21 of the portable electronic device to displace different portions of a full-view image of the media content on display field DF (step 340).

The present invention recited herein is described with reference to exemplary embodiments including modes of operation to illustrate the technical features and principles thereof and it is clear that a variety of modifications and apparent changes may too be possible and shall too be considered to be within the spirit of the present invention. The scope of the present invention shall be considered by the appended claims.

What is claimed is:

1. An electronic control apparatus for use with a portable electronic device integrated with a display comprising a display field for displaying a media content comprising:
   a motion sensing module, having sensing circuitry, configured to generate a sensing signal with an acceleration value; and
   a processing unit, having processing circuitry, the processing unit configured to process the sensing signal and determine whether the acceleration value is greater than a first threshold acceleration value such that the processing unit controls the display to display a previous or next image of the media content responsive to the acceleration value being greater than the first threshold acceleration value;
   wherein a second threshold acceleration value is greater than the first threshold acceleration value, and the processing unit is configured to determine whether the acceleration value is greater than the second threshold acceleration value such that the processing unit controls the display to switch to a first image or a last image of the media content on the display field thereof, responsive to the acceleration value being greater than the second threshold acceleration value.

2. The electronic control apparatus as claimed in claim 1, wherein the motion sensing module has an accelerometer configured to detect axial accelerations of the electronic control apparatus.

3. The electronic control apparatus as claimed in claim 1, wherein the motion sensing module has a gyroscope configured to detect angular velocities of the electronic control apparatus.

4. The electronic control apparatus as claimed in claim 1, wherein the motion sensing module has a magnetometer configured to detect magnetism of the electronic control apparatus.

5. The electronic control apparatus as claimed in claim 1, wherein the motion sensing module is configured to detect a rotation of the portable electronic device to determine a first rotation angle responsively.

6. The electronic control apparatus as claimed in claim 5, wherein the processing unit is configured to determine whether the first rotation angle is greater than a first threshold angle and zoom in or zoom out the display of the portable electronic device such that the media content displayed on the display field is correspondingly zoomed in or zoomed out in response to the first rotation angle being greater than the first threshold angle.

7. The electronic control apparatus as claimed in claim 6, wherein the media content comprises a full-view image having an overall dimension greater than a viewing border of the display field; and
   wherein the motion sensing module is configured to sense a second rotation angle of the portable electronic device responsive to the portable electronic device being subject to second rotations; and
   wherein the processing unit comprises a second threshold angle and is configured to determine whether the second rotation angle is greater than the second threshold angle such that the full-view image displayed on the display field is displaced within the viewing border of the display field of the display when the second rotation angle is greater than the second threshold angle.

8. The electronic control apparatus as claimed in claim 7, the motion sensing module is configured to detect a rotation of a roll of the portable electronic device about a z-axis in a counterclockwise and clockwise manner to generate the second rotation angle responsively.

9. The electronic control apparatus as claimed in claim 1, wherein the motion sensing module is configured to detect a rotation of a yaw of the portable electronic device about a y-axis in a counterclockwise and clockwise manner to generate the acceleration value responsively.

10. The electronic control apparatus as claimed in claim 1, further comprising an analogue-to-digital (A/D) signal convertor electrically connected to the motion sensing module and the processing unit.

11. A method for controlling media content displayed on a display field of a display of a portable electronic device, the control method comprising:
presetting a first threshold acceleration value and a second threshold acceleration value;
determining an acceleration value using a motion sensing module;
determining whether the acceleration value is greater than the first threshold acceleration value;
controlling the display such that a previous or next image of the media content is displayed on the display field when the acceleration value is greater than the first threshold acceleration value;
determining whether the acceleration value is greater than the second threshold acceleration value; and
controlling the display such that a first image or a last image of the media content is displayed on the display field when the acceleration value is greater than the second threshold acceleration value.

12. The method as claimed in claim 11, further comprising:
calculating a first rotation angle based on a rotation sensing signal generated by the motion sensing module;
determining whether the first rotation angle is greater than a first threshold angle; and
zooming in or zooming out the display of the portable electronic device such that the media content displayed on the display field is correspondingly zoomed in or zoomed out in response to the first rotation angle is greater than the first threshold angle.

13. The method as claimed in claim 12, further comprising displaying a full view image of the media content with an overall field greater than a viewing border of the display field.

14. The method as claimed in claim 13, further comprising:
calculating a second rotation angle based on the rotation sensing signal generated by the motion sensing module;
determining whether the second rotation angle is greater than a second threshold angle; and
displacing the full view image of the media content on the display field when the second rotation angle is greater than the second threshold angle.

* * * * *